United States Patent [19]
Kanemichi et al.

[11] Patent Number: 6,095,129
[45] Date of Patent: Aug. 1, 2000

[54] TENSION ADJUSTING MECHANISM FOR WIRE SAW

[75] Inventors: Yukihiro Kanemichi, deceased, late of Toyama, by Kumiko Kanemchi, legal heir; Etsuo Kiuchi, Gunma, both of Japan

[73] Assignee: Nippei Toyama Corporation, Tokyo, Japan

[21] Appl. No.: 09/103,538

[22] Filed: Jun. 24, 1998

[30] Foreign Application Priority Data

Jun. 24, 1997 [JP] Japan ................................ 9-167308

[51] Int. Cl.$^7$ .................................................. B28D 1/06
[52] U.S. Cl. .................................. 125/16.02; 451/311
[58] Field of Search ........................ 125/16.01, 16.02, 125/21; 451/311

[56] References Cited

U.S. PATENT DOCUMENTS

| | | | |
|---|---|---|---|
| 3,824,982 | 7/1974 | Bowman | 125/16 |
| 4,903,682 | 2/1990 | Kurokawa | 125/16 R |
| 5,099,615 | 3/1992 | Ruble et al. | 51/165.71 |
| 5,735,258 | 4/1998 | Okuno et al. | 125/16.02 |
| 5,829,424 | 11/1998 | Hauser | 125/16.01 |
| 5,839,425 | 11/1998 | Toyama et al. | 125/16.02 |
| 5,874,678 | 2/1999 | Yamamoto | 73/661 |
| 5,896,851 | 4/1999 | Katamachi et al. | 125/16.02 |
| 5,907,988 | 6/1999 | Kiuchi et al. | 83/651.1 |

*Primary Examiner*—Timothy V. Eley
*Assistant Examiner*—Dung Van Nguyen
*Attorney, Agent, or Firm*—Sughrue, Mion, Zinn, Macpeak & Seas, PLLC

[57] ABSTRACT

There is provided a tension adjusting mechanism which can prevent a dancer arm from being widely rotated and a peripheral roller such as a guide roller from early abrading even in the case a wire is tensioned or loosened in accordance with a speed increase or decrease of the wire. A plurality of dancer rollers are rotatably supported to a front end of a rotatable dancer arm. A plurality of guide rollers are disposed in such a manner as to oppose to the dancer rollers, thereby successively guiding one wire on the dancer roller through the guide rollers. A predetermined tension is applied to the wire by rotating and urging the dancer arm to one direction by an urging member.

18 Claims, 7 Drawing Sheets

TENSION ADJUSTING MECHANISM FOR WIRE SAW

BACKGROUND OF THE INVENTION

The present invention relates to a tension adjusting mechanism for applying a predetermined tension to a wire, for example, used for a wire saw.

In the case of cutting a work made of a hard and brittle material such as a semiconductor material, a magnetic material and a ceramic, a wire saw has been used. In the wire saw, a plurality of working rollers are provided at a predetermined interval, and a plurality of annular grooves are formed on an outer periphery of each of the rollers at a predetermined pitch. Further, between the working rollers, a wire is successively wound around the annular groove, and a predetermined tension is applied to the wire by means of a tension adjusting mechanism. Then, a slurry containing float abrasive grains is supplied to a portion on the wire while the wire is moved, and the work is pressed to and brought into contact with the wire in this state, so that the cutting process is given to the work.

Figure 11:
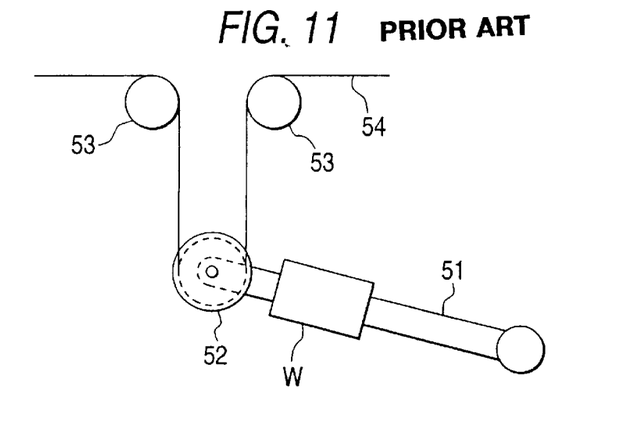
FIG. 11 is a schematic view of a tension adjusting mechanism in accordance with the conventional art.

In accordance with the tension adjusting mechanism in this kind of wire saw of the conventional art, as shown in FIG. 11, a dancer roller 52 is rotatably supported to a front end of a rotatable dancer arm 51 mounting a weight W thereto in an adjustable manner, and the weight W is directly provided in the dancer roller 52 so as to apply a tension to a wire 54. Two guide rollers 53 are disposed in such a manner as to oppose to the dancer roller 52, and a wire 54 is wound on the dancer roller 52 through these guide rollers 53. The weight W is mounted to the front end of the dancer arm 51, and the dancer roller 52 is rotated and urged to a direction of being apart from the guide roller 53 by the weight W, so that it is structured such that a predetermined tension is applied to the wire 54.

However, in the conventional tension adjusting mechanism, the wire 54 is guided to the portion on one dancer roller 52 through the guide roller 53. Accordingly, when the wire 54 is tensed or loosened in correspondence to a sudden speed increase and decrease of the wire 54, the dancer roller 52 is vertically oscillated (hunted) at a great amplitude corresponding to half of a tensioning amount or a loosening amount of the wire 54 so as to maintain a predetermined wire tension. Then, there have been problems that the great oscillation is transmitted to the guide roller 53 and a working roller (not shown) through the wire 54 so as to abrade the rollers at an early time, and the oscillation is transmitted to the working roller so that a working accuracy is lowered. Further, in the case that the oscillation is sudden, there has been a case that the wire 54 is cut.

SUMMARY OF THE INVENTION

The present invention is made by taking the problems existing in the prior art into consideration. It is an object of the invention to provide a tension adjusting mechanism for a wire saw which can prevent a peripheral roller such as a guide roller from early abrading and a working accuracy from being lowered even in the case that a wire is tensioned or loosened in accordance with a speed increase or decrease of the wire.

In order to achieve the object mentioned above, in accordance with the invention, there is provided a tension adjusting mechanism for a wire saw comprising:

a plurality of guide rollers around which a wire is wound;

a dancer arm rotatably supported on a body of the wire saw, a plurality of dancer rollers rotatably supported at one end of the dancer arm, movable relative to the guide rollers, and disposed opposite to the guide rollers for guiding the wire towards at least one of the guide rollers;

urging means for urging the dancer roller in one direction so as to adjust a tension to the wire.

In the above-mentioned construction of the tension adjusting mechanism for a wire saw according to the present invention, preferably, the dancer rollers are rotatably supported on the one end of the dancer arm so as to rotate around an axis in parallel to a rotating axis of the dancer arm.

In addition, the above-mentioned construction of the tension adjusting mechanism for a wire saw according to the present invention, preferably, further comprises:

a mounting block rotatably fixed to the front end of the dancer arm, in which the dancer rollers are rotatably supported on the mounting block so as to rotate around an axis in parallel to a rotating axis of the dancer arm.

Further, in the above-mentioned construction of the tension adjusting mechanism for a wire saw according to the present invention, preferably, the mounting block is formed into a V-shape.

In the above-mentioned construction of the tension adjusting mechanism for a wire saw according to the present invention, advantageously, the V-shaped mounting block includes: a bottom portion rotatably supported on the dancer arm; and a pair of tip end portions extended from the bottom portion on which the dancer roller and the second dancer roller are respectively rotatably supported.

The above-mentioned construction of the tension adjusting mechanism for a wire saw according to the present invention, advantageously, further comprises:

a guide roller supporting member rotatably supported on a body of the wire saw, the plurality of guide rollers being rotatably supported on the guide roller supporting member.

In the above-mentioned construction of the tension adjusting mechanism for a wire saw according to the present invention, advantageously, the plurality of guide rollers are rotatably supported on the guide roller supporting member so as to rotate around an axis in parallel to a rotating axis of the dancer arm.

In the above-mentioned construction of the tension adjusting mechanism for a wire saw according to the present invention, advantageously, the guide roller supporting member is formed in a V-shape which includes:

a bottom part rotatably supported on the body of the wire saw; and a pair of tip end parts extended from the bottom part on which the plurality of guide rollers are respectively rotatably supported.

In the above-mentioned construction of the tension adjusting mechanism for a wire saw according to the present invention, advantageously, the urging means is constituted by a motor.

DESCRIPTION OF THE PREFERRED EMBODIMENTS (First Embodiment)

A first embodiment embodying the present invention will be described below with reference to FIGS. 1 to 4.

Figure 1:
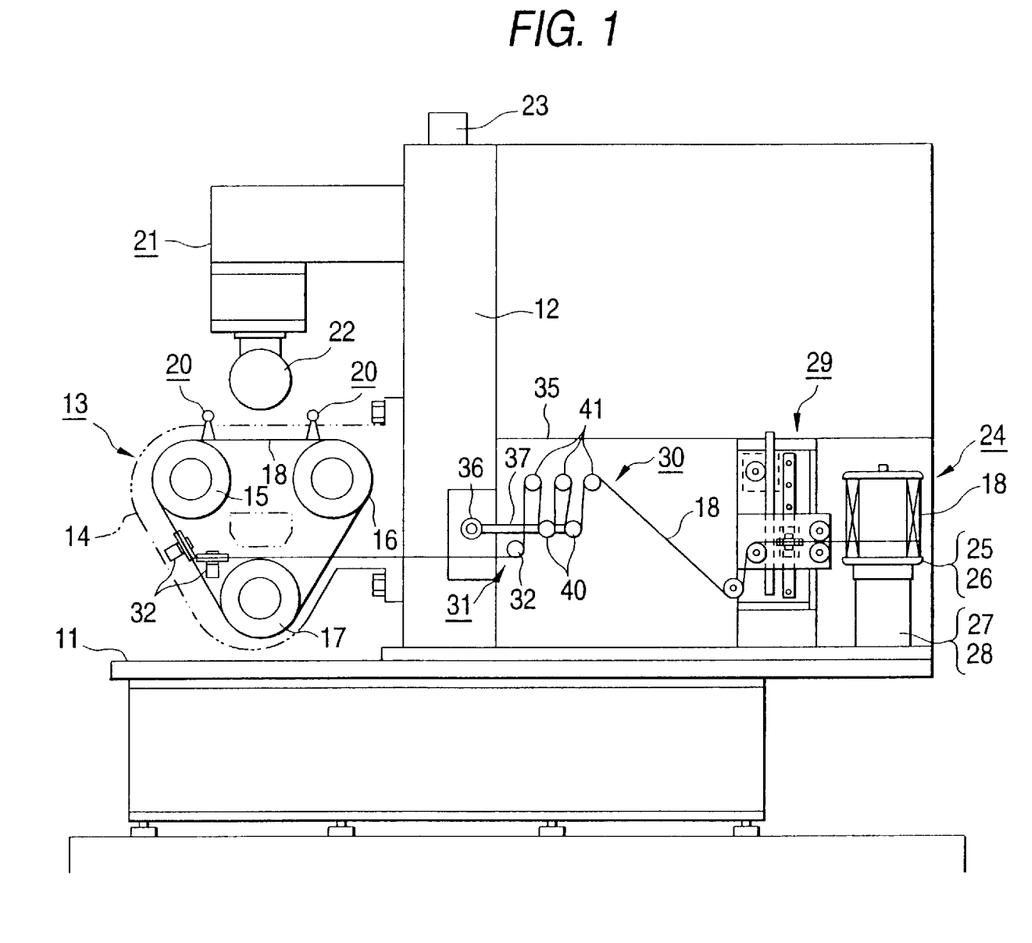
FIG. 1 is a front elevational view of a wire saw which shows a first embodiment of the invention.
Figure 2:
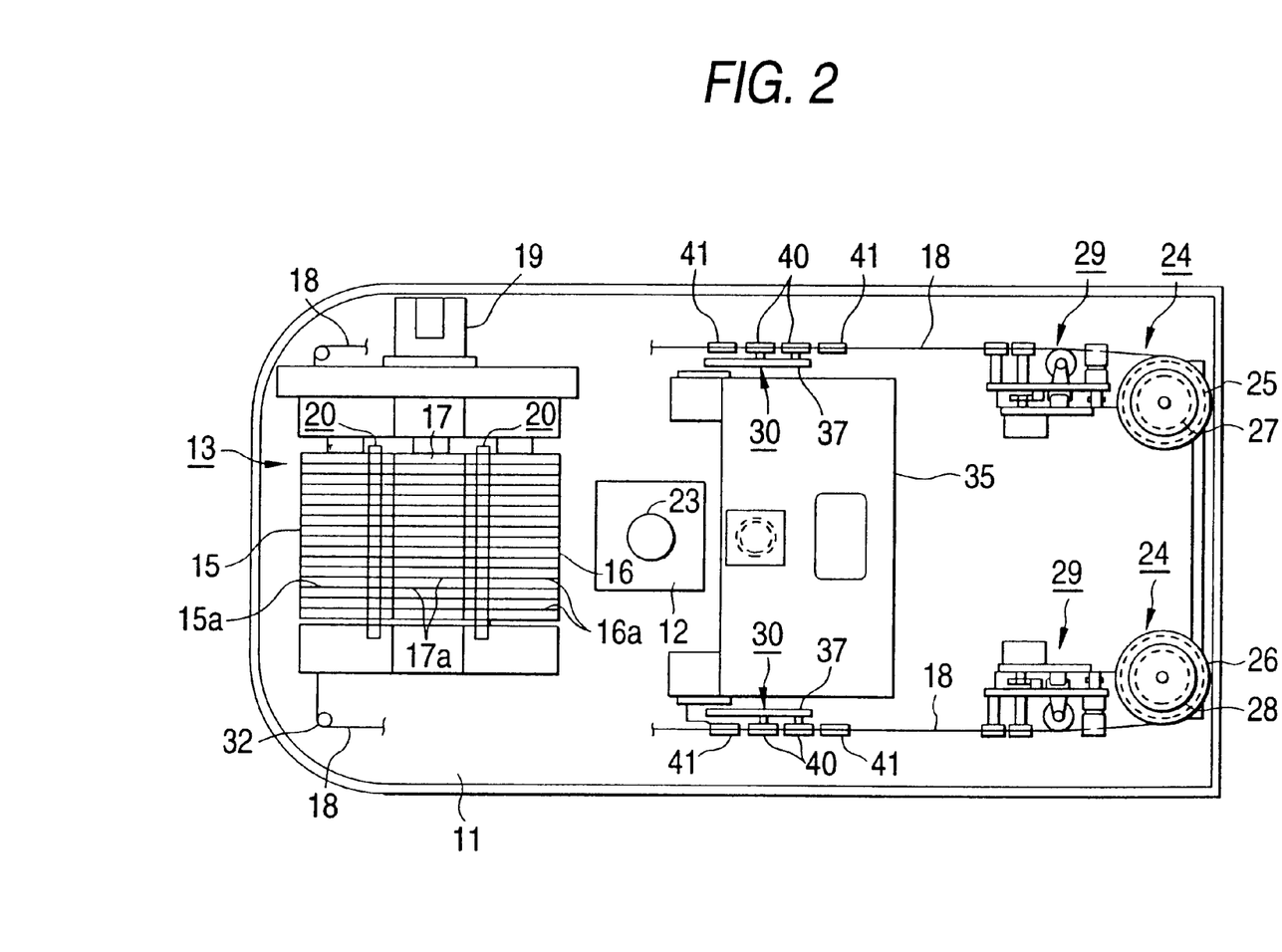
FIG. 2 is a plan view of the wire saw.

At first, a structure of a wire saw will be described. As shown in FIGS. 1 and 2, a column 12 is provided on a base table 11 in a standing manner. A cutting mechanism 13 is provided in the column 12 through a bracket 14. The cutting mechanism 13 is provided with a plurality of working rollers 15, 16 and 17 extending in parallel at a predetermined interval, annular grooves 15a, 16a and 17a are formed on an outer periphery thereof at a predetermined pitch. In this case, in order to facilitate the understanding, the annular grooves 15a, 16a and 17a are described in the drawings in such a manner as to reduce a number thereof in comparison with an actual number.

One wire 18 is continuously wound around each of the annular grooves 15a, 16a and 17a of the working rollers 15, 16 and 17. A motor for moving a wire is disposed in the bracket 14, the working rollers 15, 16 and 17 are rotated by the motor 19 through a transmitting mechanism (not shown). Then, the wire 18 is moved by a rotation of these working rollers 15, 16 and 17 at a predetermined moving speed. The movement of the wire 18 is performed such that an advance for a predetermined amount (for example, 10 m) and a retraction for a given amount (for example, 9 m) which is smaller than the predetermined amount are repeated, thereby totally advancing step by step.

A slurry supplying mechanism 20 is disposed on the bracket 14 in such a manner as to be positioned above the cutting mechanism 13, and a water slurry or an oil slurry containing float abrasive grains is supplied on the wire 18 between the working rollers 15, 16 and 17 from the slurry supplying mechanism 20. A work supporting mechanism 21 is supported to the column above the slurry supplying mechanism 20 in such a manner as to be capable of vertically moving, and a work 22 made by a hard and brittle material is detachably set in the lower portion thereof. A motor 23 for vertically moving the work is disposed on the column 12, the work supporting mechanism 21 is vertically moved by the motor 23 through a ball screw (not shown).

Then, at a time of operating the wire saw, the work supporting mechanism 21 is descended toward the cutting mechanism 13 while the wire 18 is moved between the working rollers 15, 16 and 17 of the cutting mechanism 13. At this time, the work 22 is pressed to and brought into contact with the wire 18 as well as the slurry containing the float abrasive grains is supplied to the portion on the wire 18 from the slurry supplying mechanism 20, so that the work 22 is cut to a wafer shape by a lapping effect.

A reel mechanism 24 is provided on the base table 11, and is provided with a draw-out reel 25 for drawing out the wire 18 and a take-up reel 26 for taking up the wire 18. A pair of reel rotating motor 27 and 28 constituted by a servo motor capable of changing a rotational direction and a rotational speed are disposed in the base table 11, and both the reels 25 and 26 are connected to the motor shaft through a transmitting mechanism (not shown).

A pair of traverse mechanisms 29 are provided on the base table 11 in an adjacent manner to the reel mechanism 24, and the traverse mechanism 29 guide the drawing-out of the wire from the draw-out reel 25 and the taking-up of the wire 18 to the take-up reel 26 with vertically traversing. Then, the worked wire is taken up to the take-up reel 26 as well as the wire 18 is drawn out to the cutting mechanism 13 from the draw-out reel 25 in accordance with the rotation of both the reels 25 and 26 of the reel mechanism 24.

A pair of tension adjusting mechanisms 30 and guide mechanisms 31 are disposed between the reel mechanism 24 and the cutting mechanism 13. Then, both ends of the wire 18 wound between the working rollers 15, 16 and 17 of the cutting mechanism 13 are hooked to the tension adjusting mechanism 30 through each of the guide rollers 32 of the guide mechanism 31. In this state, it is structured such that a predetermined tension is applied to the wire 18 between the working rollers 15, 16 and 17 by the tension adjusting mechanism 30.

Next, a structure of the tension adjusting mechanism 30 will be described below in further detail.

As shown in FIGS. 1 to 4, a supporting frame 35 is disposed on the base table 11, and a torque motor 36 constituting an urging member serving as the urging means for applying a tension to the wire 18 is mounted to an outer side portion. A dancer arm 37 is mounted to a motor shaft 36a of the torque motor 36 in a base end thereof, and is structured such as to be rotated around a rotating axis P of the base end together with the motor shaft 36a thereof.

A mounting block 38 is fixed to a front end of the dancer arm 37, and a supporting plate 39 is mounted to an outer surface thereof. A pair of dancer roller 40 are supported to an outer surface of the supporting plate 39 in such a manner as to respectively rotate around an axis in parallel to the rotating axis P of the dancer arm 37, and a pair of annular grooves 40a for hooking the wire 18 are formed on the outer peripheral surfaces thereof.

In order to oppose to the above portion of the dancer roller 40 at a predetermined interval, three guide rollers 41 are supported to the supporting frame 35 in such a manner as to be capable of rotating around the axis in parallel to the rotating axis of the dancer roller 40, and a pair of annular grooves 41a for hooking the wire 18 are formed on the outer peripheral surface thereof. Then, the wire 18 is alternately hooked between the guide roller 41 and the dancer roller 40, so that it is structured such that the wire 18 is successively guided on the dancer roller 40.

In this case, the dancer roller 40 and the guide roller 41 respectively have a pair of annular grooves 40a and 41a as mentioned above, however, the wire 18 is hooked to one of the annular grooves 40a and 41a. The other annular groove 40a or the annular groove 41a is a preliminary one.

An encoder 42 is mounted to a rear portion of the torque motor 36, and a detecting shaft 42a is connected to the motor shaft 36a through a coupling 43. Then, the dancer arm 37 is rotated and urged to a clockwise direction in FIG. 3 by the torque motor 36, so that it is structured such that a rotational position of the torque motor 36 is detected by the encoder 42 as well as a predetermined tension is applied to the wire 18.

Next, an operation of the wire saw structured in the above manner will be described below.

Then, in the wire saw, after the wire 18 is drawn out from the draw-out reel 25 of the reel mechanism 24, and is oscillated and moved between the working rollers 15, 16 and 17 of the cutting mechanism 13 step by step, the wire 18 is finally taken up to the take-up reel 26. Then, the work 22 is pressed to and brought into contact with the wire 18 due to the descent of the work supporting mechanism 21 while the slurry containing the float abrasive grains is supplied to the portion on the wire 18 between the working rollers 15, 16 and 17 by the slurry supplying mechanism 20. Accordingly, the work 22 is cut to a predetermined thickness.

Figure 3:
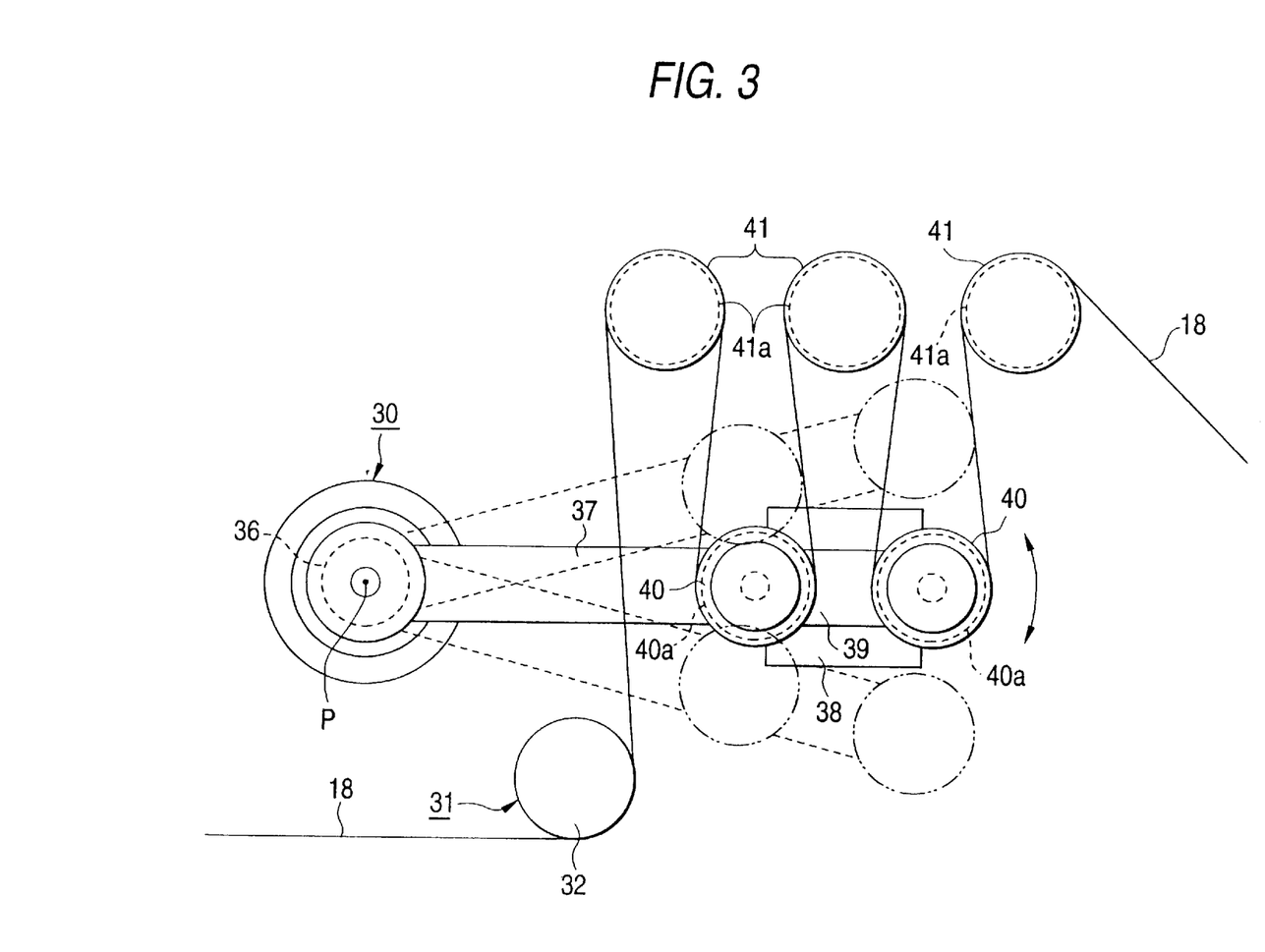
FIG. 3 is a front elevational view which shows a main portion of a tension adjusting mechanism in an enlarged manner.
Figure 4:
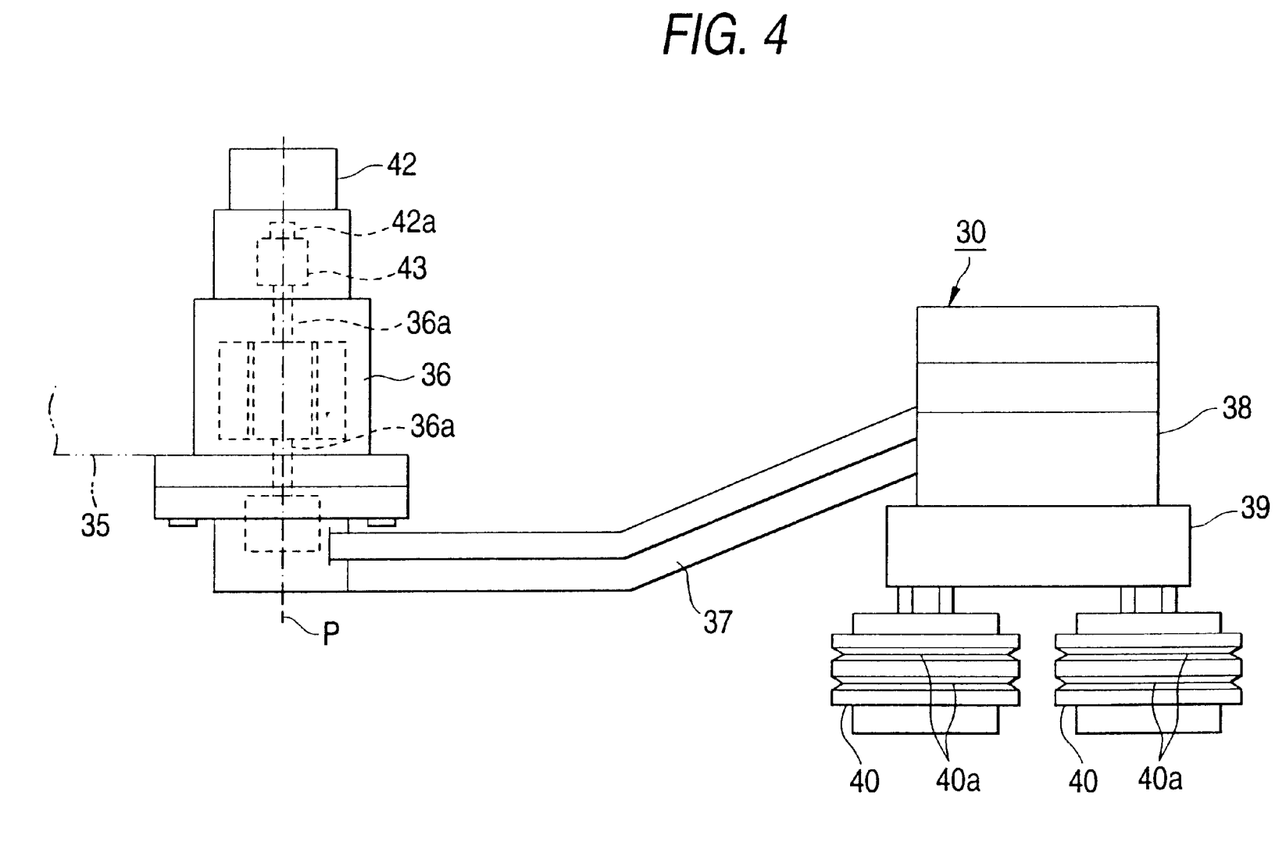
FIG. 4 is a plan view of a main portion in the tension adjusting mechanism.

At a time of cutting the work 22, in the tension adjusting mechanism 30, the dancer arm 37 is rotated and urged to a clockwise direction in FIG. 3 by the torque motor 36, so that a predetermined tension is applied to the wire 18. Then, in the case that the moving speed of the wire 18 is suddenly increased or decreased, when the tension or the looseness is generated in the wire 18, the dancer arm 37 is vertically rotated around the rotating axis P of the dancer arm 37 as shown by a chain line in FIG. 3. Accordingly, a tension variation in response to the tension or the looseness of the wire 18 can be absorbed.

At this time, two dancer rollers 40 are supported to the front end of the dancer arm 371 and it is structured such that the wire 18 can be successively guided on the dancer rollers 40 through three guide rollers 41. Accordingly, in this embodiment, the dancer arm 37 and the dancer roller 40 are rotated with a small amplitude corresponding to a quarter the tensing amount or the loosening amount of the wire 18. Therefore, in comparison with the case of one dancer roller 40, an oscillation of the dancer arm 37 is made small, so that no great oscillation is transmitted to the guide roller 41 of the tension adjusting mechanism 30, the guide roller 32 of the guide mechanism 31 and the working rollers 15, 16 and 17 of the cutting mechanism 13 through the wire 18.

An effect expected by the embodiment mentioned above will be described below.

In the tension adjusting mechanism in accordance with this embodiment, a plurality of dancer roller 40 is rotatably supported to the front end of the rotatable dancer arm 37. Further, a plurality of guide rollers 41 are disposed in such a manner as to oppose to the dancer rollers 40, so that it is structured such that one wire 18 is successively guided on the dancer roller 40 through the guide rollers 41. Still further, the dancer arm 37 is rotated and urged to one direction by the torque motor 36 serving as the urging means, so that it is structured such that a predetermined tension can be applied to the wire 18.

Accordingly, even in the case that the wire 18 is tensioned or loosened in accordance with the speed increase or decrease of the wire 18, the dancer arm 37 is not widely rotated, so that the peripheral roller such as the guide roller 41 can be prevented from early abrading, and the working accuracy can be prevented from lowering.

In the tension adjusting mechanism in accordance with this embodiment, a plurality of dancer rollers 40 are supported to the front end of the dancer arm 37 in such a manner as to be capable of rotating around the axis in parallel to the rotating axis P thereof. Accordingly, one wire 18 can be guided without biasing the wire to the direction of the rotating axis of each of the rollers 40 and 41 between the guide roller 41 and the dancer roller 40. Therefore, it is prevented that a shifted abrasion is generated in the rollers 40 and 41.

In the tension adjusting mechanism in accordance with this embodiment, the urging means for rotating and urging the dancer arm 37 is constituted by the torque motor 36. Accordingly, in the case that a material and a size of the work 22 are changed, it is possible to easily set and change the tension to be applied to the wire 18, and further, it is possible to release the application of the tension against the wire 18 at a time of attaching, detaching and replacing the wire 18.

(Second Embodiment)

Next, a second embodiment of the invention will be described below mainly in view of portions different from the first embodiment.

Figure 5:
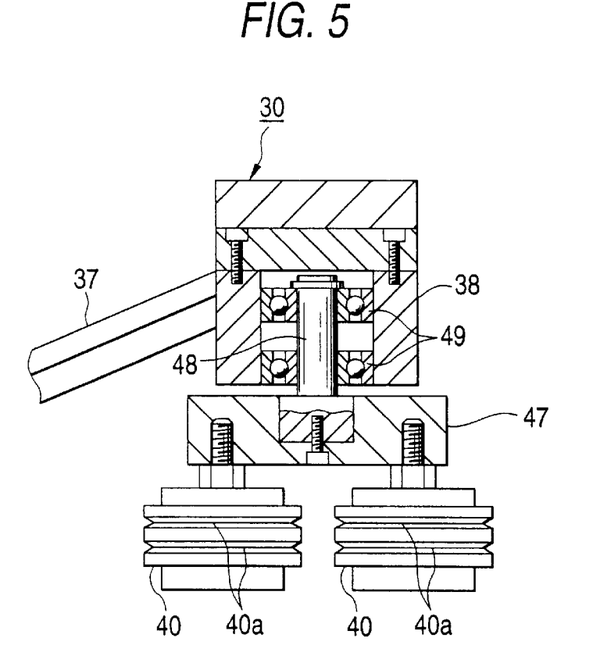
FIG. 5 is a cross sectional view which shows a main portion of a second embodiment of a tension adjusting mechanism.
Figure 6:
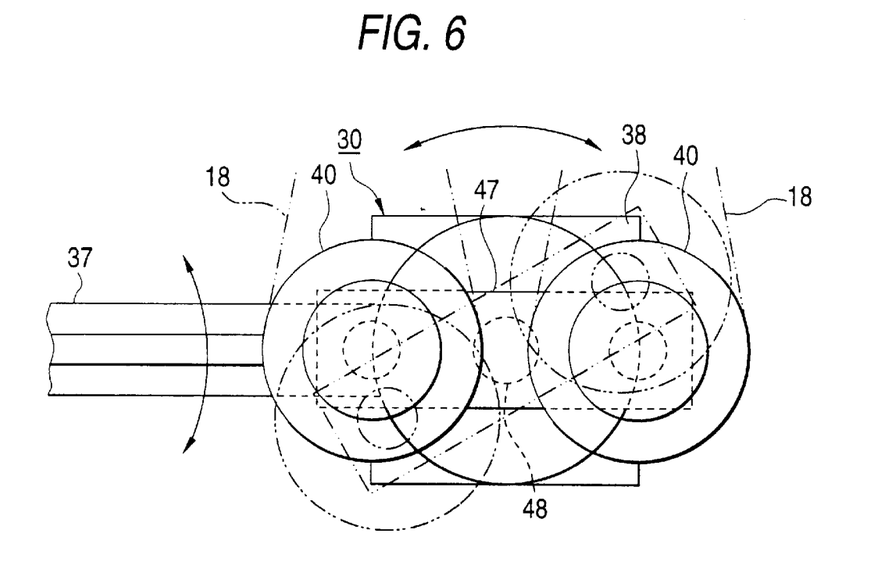
FIG. 6 is a front elevational view of a main portion of the tension adjusting mechanism.

In this case, in the second embodiment, as shown in FIGS. 5 and 6, a rotation supporting plate 47 serving as a first rotation supporting member is rotatably supported to a mounting block 38 in the front end of the dancer arm 37 through a rotating axis 48 and a pair of bearings 49. Further, a pair of dancer rollers 40 are supported to an outer surface of the rotation supporting plate 47 in such a manner as to rotate around an axis in parallel to the rotating axis 48.

Then, in the case that a tension change is generated in the wire in a state that the wire 18 is hooked between the dancer roller 40 and the guide roller 41, at first the rotation supporting plate 47 is rotated together with the rotating axis 48, and a pair of dancer rollers 40 are inclined, so that it is structured such that the tension change of the wire 18 can be quickly absorbed.

Accordingly, also in the second embodiment, an effect substantially the same as that of the first embodiment mentioned above can be obtained. Further, in accordance with this second embodiment, the rotation supporting plate 47 is rotatably supported to the front end of the dancer arm 37, and a plurality of dancer rollers 40 are supported on the rotation supporting plate 47 in such a manner as to be capable of rotating around the axis in parallel to the rotating shaft 48. Accordingly, in the case that the tension change is generated in the wire 18, the tension change in the wire 18 can at first absorbed by the rotation of the rotation supporting plate 47, so that the dancer arm 37 can be kept in a horizontal state. Then, the sudden oscillation in the dancer arm 37 can be prevented, and a predetermined tension can be always applied to the wire 18.

(Third Embodiment)

Next, a third embodiment of the invention will be described below mainly in view of portions different from the first embodiment.

Figure 7:
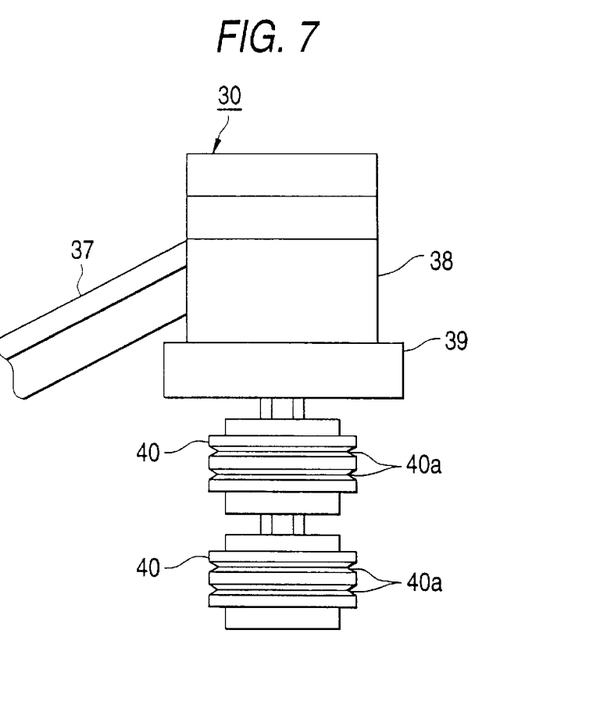
FIG. 7 is a plan view which shows a main portion of a third embodiment of a tension adjusting mechanism.

In this case, in the third embodiment, as shown in FIG. 7, a supporting plate 39 is mounted to the front end of the dancer arm 37 through the mounting block 38. Further, a pair of dancer rollers 40 are supported to an outer surface of the supporting plate 39 in such a manner as to be capable of rotating on the same axis. Then, it is structured such that the wire 18 can be successively guided on the dancer roller 40 through the guide roller 41.

Accordingly, also in the third embodiment, an effect substantially the same as that of the first embodiment mentioned above can be obtained.

In this case, the invention can be realized by modifying in the following manner.

A number of the dancer arm 40 can be changed to a plural number equal to or more than three.

As the urging means for rotating and urging the dancer arm 37, in place of the torque motor 36 in accordance with the embodiments mentioned above, a weight having a predetermined weight is mounted to the front end of the dancer arm 37.

A pair of dancer arms 37 are respectively provided at the draw-out end and the take-up end for the wire 18, and one dancer roller 40 is respectively provided in each of the dancer arms 37.

Figure 8:
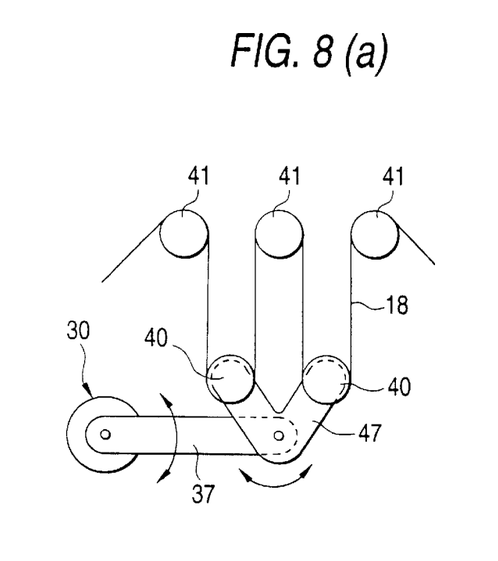
FIGS. 8A and 8B are schematic views showing the other embodiment in which a shape of a rotation supporting plate for supporting a dancer roller.

As shown in FIG. 8A, the shape of the rotation supporting plate 47 mentioned in the second embodiment is formed in an inverted-V shape. In accordance with this structure, a stability of absorbing the oscillation of the rotation supporting plate 47 due to the tension change of the wire 18 can be improved.

As shown in FIG. 8B, the shape of the rotation supporting plate 47 shown in FIG. 8A is changed in a V shape.

Figure 9A:
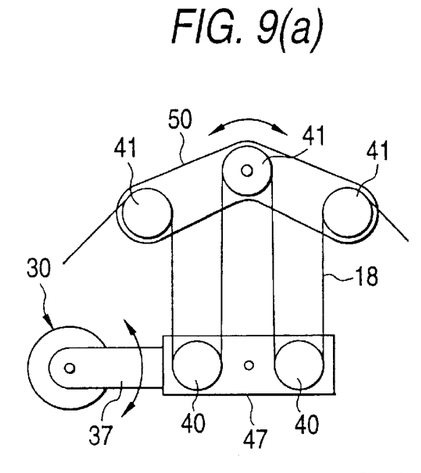
FIGS. 9A and 9B are schematic views showing the other embodiment in which a shape of a rotation supporting plate for supporting a guide roller.

In the second embodiment mentioned above, each of the guide rollers 41 is rotatably provided in the supporting frame 35, however, as shown in FIG. 9A, a rotation supporting plate 50 serving as a second rotation supporting member formed in a V shape is rotatably supported to the supporting frame 35.

Then, each of the guide rollers 41 is rotatably supported to the rotation supporting plate 50, so that a rotating axis of the rotation supporting plate 50 and a rotating axis of the guide roller 40 positioned at a center portion are coincided with each other. In accordance with this structure, a stability of absorbing the oscillation of the rotation supporting plate 50 due to the tension change of the wire 18 can be improved.

Figure 9B:
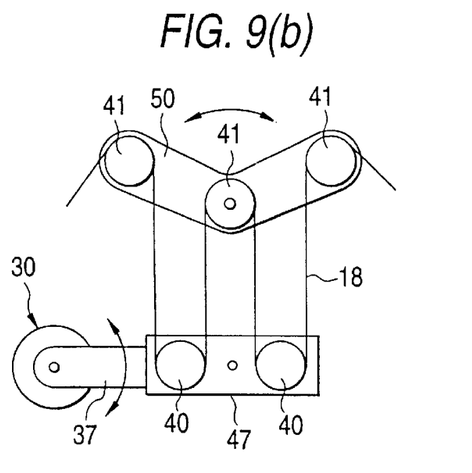

As shown in FIG. 9B, the shape of the rotation supporting plate 50 shown in FIG. 9A is changed to an inverted-V shape.

Figure 10:
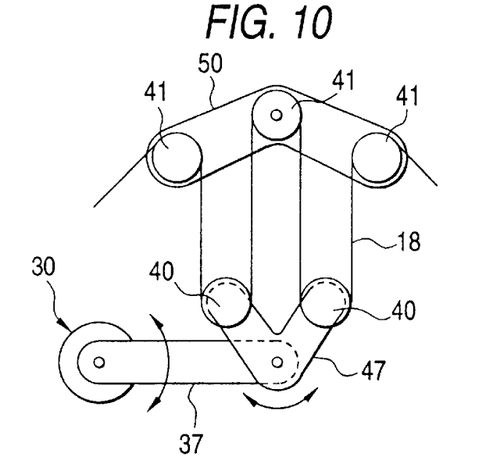
FIG. 10 is a schematic view showing the other embodiment in which a shape of a rotation supporting plate for supporting a dancer roller and a guide roller.

As shown in FIG. 10, as well as each of the dancer rollers 40 is rotatably supported to the rotation supporting plate 47 formed in a V shape, each of the guide rollers 41 is rotatably supported to the rotation supporting plate 50 formed in an inverted-V shape. In accordance with this structure, a stability of absorbing the oscillation of the rotation supporting plates 47 and 50 due to the tension change of the wire 18 can be further improved.

Since the invention is structured in the above manner, the following effects can be obtained.

In accordance with the present invention, even in the case that the wire is tensioned or loosened in response to the speed increase of decrease of the wire, it is prevented that the peripheral roller such as the guide roller is early abraded and the working accuracy is lowered.

In accordance with the invention, one wire can be successively guided between the guide roller and the dancer roller without being shifted to the axial direction of each of the rollers, so that the shifted abrasion can be prevented from generating in the rollers.

In accordance with the invention, in the case that the tension change is generated in the wire, the tension change of the wire can be absorbed by the rotation of the first rotation supporting member, so that a predetermined tension can be always applied to the wire.

In accordance with the invention, a stability of absorbing the oscillation of the first rotation supporting member due to the tension change of the wire can be improved.

In accordance with the invention, a stability of absorbing the oscillation of the second rotation supporting member due to the tension change of the wire can be improved.

In accordance with the invention, the tension applied to the wire can be set and changed as occasion demands, and the application of the tension can be released, so that the tension of the wire can be suitably maintained.

What is claimed is:

1. A tension adjusting mechanism for a wire saw comprising:
   a plurality of guide rollers (41) around which a wire (18) is wound;
   a dancer arm (37) rotatably supported on a body of said wire saw;
   a plurality of dancer rollers (40) rotatably supported at one end of said dancer arm, movable relative to said guide rollers (41), and disposed opposite to said guide rollers (41) for guiding said wire towards at least one of said guide rollers; and
   urging means for urging said dancer rollers in one direction so as to adjust a tension in said wire.

2. The tension adjusting mechanism for a wire saw according to claim 1, in which said dancer rollers (40) are rotatably supported on said one end of said dancer arm so as to rotate around respective axes that are parallel to a rotating axis of said dancer arm.

3. The tension adjusting mechanism for a wire saw as recited in claim 1, further comprising:
   a mounting block (38) rotatably fixed to said one end of said dancer arm (37), said dancer rollers (40) being rotatably supported on said mounting block (38) so as to rotate around respective axes that are parallel to a rotating axis of said dancer arm.

4. The tension adjusting mechanism for a wire saw as recited in claim 3, in which said mounting block (38) is V-shaped.

5. The tension adjusting mechanism for a wire saw as recited in claim 4, in which said V-shaped mounting block (38) includes:
   a bottom portion rotatably supported on said dancer arm; and
   a pair of tip end portions extended from said bottom portion, each of said tip end portions rotatably supporting one of said dancer rollers.

6. The tension adjusting mechanism for a wire saw as recited in claim 1, further comprising:
   a guide roller supporting member (50) rotatably supported on a body of said wire saw, said plurality of guide rollers (41) being rotatably supported on said guide roller supporting member.

7. The tension adjusting mechanism for a wire saw as recited in claim 6, in which said plurality of guide rollers (41) are rotatably supported on said guide roller supporting member (50) so as to rotate around respective axes that are parallel to a rotating axis of said dancer arm.

8. The tension adjusting mechanism for a wire saw as recited in claim 6, wherein said guide roller supporting member is V-shaped, and includes:
   a bottom part rotatably supported on said body of said wire saw; and
   a pair of tip end parts extended from said bottom part on which said plurality of guide rollers are respectively rotatably supported.

9. The tension adjusting mechanism for a wire saw as recited in claim 1, wherein said urging means is a motor.

10. A tension adjusting mechanism for a wire saw, the tension adjusting mechanism comprising:
    a body;
    a plurality of guide rollers rotatably mounted on said body;
    a wire wound around said plurality of guide rollers;
    a dancer arm rotatably supported on said body;
    a plurality of dancer rollers rotatably supported on said dancer arm, said plurality of dancer rollers guiding said wire towards at least one of said plurality of guide rollers; and a mechanism that urges said plurality of dancer rollers in a direction to adjust a tension in said wire.

11. The tension adjusting mechanism for a wire saw according to claim 10, in which said plurality of dancer rollers are rotatable around respective axes that are parallel to a rotating axis of said dancer arm.

12. The tension adjusting mechanism for a wire saw as recited in claim 10, further comprising:

a mounting block rotatably fixed to said dancer arm, said plurality of dancer rollers being rotatably supported on said mounting block so as to rotate around respective axes that are parallel to a rotating axis of said dancer arm.

13. The tension adjusting mechanism for a wire saw as recited in claim 12, in which said mounting block is V-shaped.

14. The tension adjusting mechanism for a wire saw as recited in claim 13, in which said V-shaped mounting block includes:

a bottom portion rotatably supported on said dancer arm; and a pair of tip end portions extended from said bottom portion, each of said tip end portions rotatably supporting one of said plurality of dancer rollers.

15. The tension adjusting mechanism for a wire saw as recited in claim 10, further comprising:

a guide roller supporting member rotatably supported on said body, said plurality of guide rollers being rotatably supported on said guide roller supporting member.

16. The tension adjusting mechanism for a wire saw as recited in claim 15, in which said plurality of guide rollers are rotatable around respective axes that are parallel to a rotating axis of said dancer arm.

17. The tension adjusting mechanism for a wire saw as recited in claim 15, wherein said guide roller supporting member is V-shaped, and includes:

a bottom part rotatably supported on said body of said wire saw; and a pair of tip end parts extended from said bottom part on which said plurality of guide rollers are respectively rotatably supported.

18. The tension adjusting mechanism for a wire saw as recited in claim 10, wherein said mechanism is a motor.

* * * * *